United States Patent [19]
Logsdon

[11] Patent Number: 5,203,221
[45] Date of Patent: Apr. 20, 1993

[54] SHAFT MOUNTABLE GEAR DRIVE
[75] Inventor: Michael A. Logsdon, Dousman, Wis.
[73] Assignee: The Falk Corporation, Milwaukee, Wis.
[21] Appl. No.: 776,198
[22] Filed: Oct. 15, 1991
[51] Int. Cl.$^5$ ............................................. F16H 1/12
[52] U.S. Cl. .................................. 74/421 R; 403/370; 411/321; 411/328
[58] Field of Search ............. 74/421 R; 403/370, 371; 411/315, 321, 322, 326, 327, 328

[56] References Cited

U.S. PATENT DOCUMENTS

| | | | |
|---|---|---|---|
| 589,545 | 9/1897 | Comra | 411/332 |
| 1,220,129 | 3/1917 | Inglis | 411/321 |
| 2,556,151 | 6/1951 | Bremer | 403/370 X |
| 3,590,652 | 7/1971 | Strang | 403/371 X |
| 4,338,036 | 7/1982 | DeLeu | 403/371 X |
| 4,452,547 | 6/1984 | Thiel et al. | 403/370 |
| 4,626,114 | 12/1986 | Phillips | 403/370 X |
| 5,067,847 | 11/1991 | Muellenberg | 403/371 X |

Primary Examiner—Allan D. Herrmann
Assistant Examiner—David W. Laub
Attorney, Agent, or Firm—Wood, Phillips, VanSanten, Hoffman & Ertel

[57] ABSTRACT

An apparatus is provided for use with a shaft mountable gear reduction drive in which a driven shaft is coupled with reduction gears by a hollow intermediate output shaft. The output shaft is journaled within the gearbox and has a tapered axial passage for receiving one end of the generally cylindrical driven shaft. A tapered bushing is wedged into the axial passage to interlock the output shaft and the driven shaft for synchronous rotation. A retaining nut is threaded to the outboard end of the output shaft and is rotated relative thereto to advance the nut axially along the driven shaft and forcefully lock the tapered bushing in place. In order to facilitate the driving engagement of the bushing with the output shaft and driven shaft, a nut locking apparatus is provided for preventing rotation of the retaining nut when the output shaft is rotated by the gear drive, and thereby drawing the tapered bushing along the driven shaft.

15 Claims, 2 Drawing Sheets

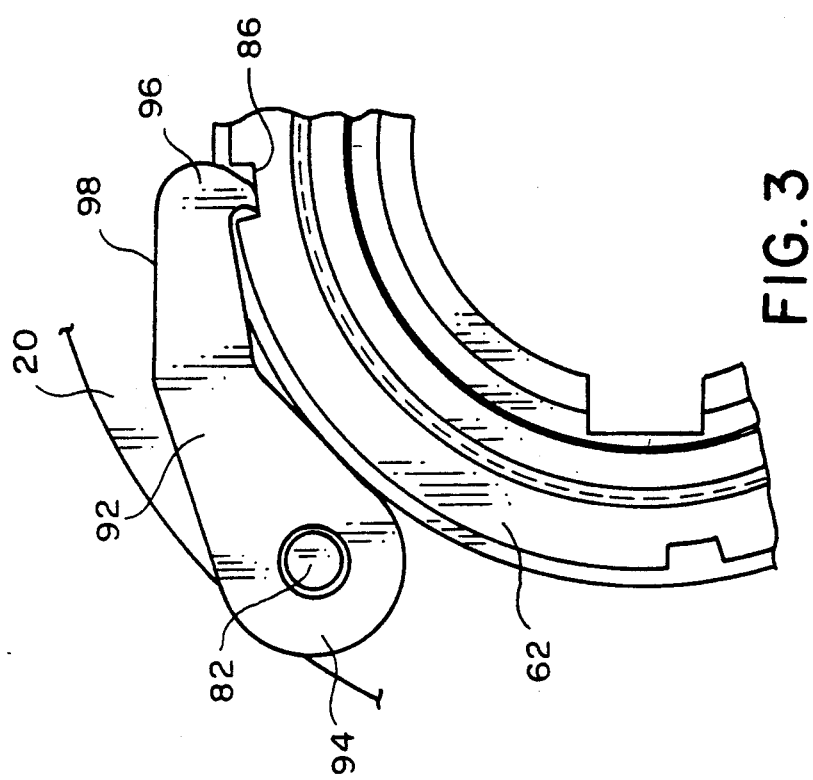

SHAFT MOUNTABLE GEAR DRIVE

BACKGROUND OF THE INVENTION

1. Technical Field

This invention relates to an apparatus for coupling a drive shaft and an associated reduction gear set with an accessory shaft to be driven thereby, and, particularly, to an apparatus for use in a shaft mountable gear drive in which torque transmitted by a gear drive set is used to generate a force adapted to facilitate the installation and removal of the gear drive to and from the accessory shaft.

2. Background Art

In a gear reduction drive, a driving input shaft transmits power from a power source to a driven shaft through a number of intermeshed gears. Frequently, the gears are mounted within a housing or gearbox, with the a driving input shaft extending through the gearbox and engaging one of the gears, and with the driven shaft extending through the gearbox and engaging another of the gears.

In one type of generally known gear reduction drive, a driven accessory shaft is coupled with the reduction gears by a hollow output shaft journaled within the gearbox. The output shaft has a tapered axial passage for receiving one end of the accessory shaft, which is generally cylindrical. An annular tapered bushing holds the accessory shaft end in the tapered axial passage for synchronous rotation therewith. A retaining nut is threaded to the output shaft outboard of the bushing and is tightened with a wrench to apply an axial force for wedging the bushing between the cylindrical accessory shaft and the interiorly tapered output shaft.

Substantial axial force is required to achieve the necessary locking action of the tapered bushing on the driven accessory shaft. Consequently, the level of torque required to be applied to the retaining nut for generating the necessary axial force can exceed the capability of an individual using a wrench to tighten the nut, making the installation of the tapered bushing and output shaft difficult, if not impossible. Also, when removing the gear drive, the tight fit of the taper may require more force than can normally be applied by a person using a wrench on the nut.

This invention is directed to solving this problem by providing a system for automatically locking or unlocking the retaining nut in response to rotation of the output shaft using the torque multiplication of the gear drive ratio.

SUMMARY OF THE INVENTION

An object, therefore, of the invention, is to provide a new and improved gear drive for a power train of the character described.

In the exemplary embodiment of the invention, a nut locking apparatus is provided for use with a gear reduction drive in which a generally cylindrical driven shaft is coupled with reduction gears by a hollow intermediate output shaft. The output shaft is journaled within the gearbox and has a tapered axial passage for receiving one end of the generally cylindrical tapered bushing which mounts on a driven accessory shaft. The tapered bushing is wedged into the axial passage to interlock the output shaft and the driven shaft for synchronous rotation. A retaining nut is threaded to the outboard end of the output shaft and is rotated relative thereto to advance the nut axially along the output shaft and forcefully lock the bushing in place.

In order to facilitate the driving engagement of the bushing with the output shaft and the driven shaft, the present invention envisions a nut locking apparatus for preventing rotation of the retaining nut when the output shaft is rotated by the gear drive, and thereby draw the retaining nut and bushing toward the output shaft automatically in response to rotation of the output shaft.

According to the invention, a nut locking apparatus has a rotary latch mounted on the gearbox housing and engageable with the retaining nut. A series of rectangular grooves are spaced peripherally around the outer sidewall of the retaining nut. The grooves are adapted to receive a substantially square end portion of the latch.

In one position of the latch, the retaining nut is prevented from rotating in a counterclockwise direction, such that counterclockwise rotation of the output shaft, in response to a manual rotation of the gear drive input shaft, causes the retaining nut to rotate clockwise relative to the output shaft. Coaction of the helical threads formed on the retaining nut and the output shaft forcefully draws the retained nut axially toward the output shaft and wedges the bushing into driving engagement between the driven shaft and the output shaft.

The reduction ratio established by the interposed gears multiplies the torque which is manually applied to rotate the gear drive. Consequently, the torque which is applied to the output shaft, and therefore the torque which is reacted by the latch, is much greater than the torque applied to the gear drive input shaft. As a result, operation of the nut locking apparatus permits the gear drive ratio to be utilized advantageously for providing a mechanical advantage sufficient to achieve adequate force to provide a driving connection between the output shaft and the driven accessory shaft in response to manual rotation of the gear drive input shaft.

In a second position of the latch, the retaining nut is prevented from rotating in a clockwise direction, such that clockwise rotation of the output shaft causes the retaining nut to rotate counterclockwise relative thereto. Coaction of the helical threads formed on the retaining nut and the output shaft in response to the relative counterclockwise rotation forces the retained nut axially away from the output shaft and disengages the bushing for removal.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, may be understood from the following description taken in conjunction with the accompanying drawings, in which like reference numerals identify like elements in the figures and in which:

FIG. 3 is a fragmentary side elevational view showing an alternative embodiment of a nut locking latch.

DESCRIPTION OF THE PREFERRED EMBODIMENT

Figure 2:
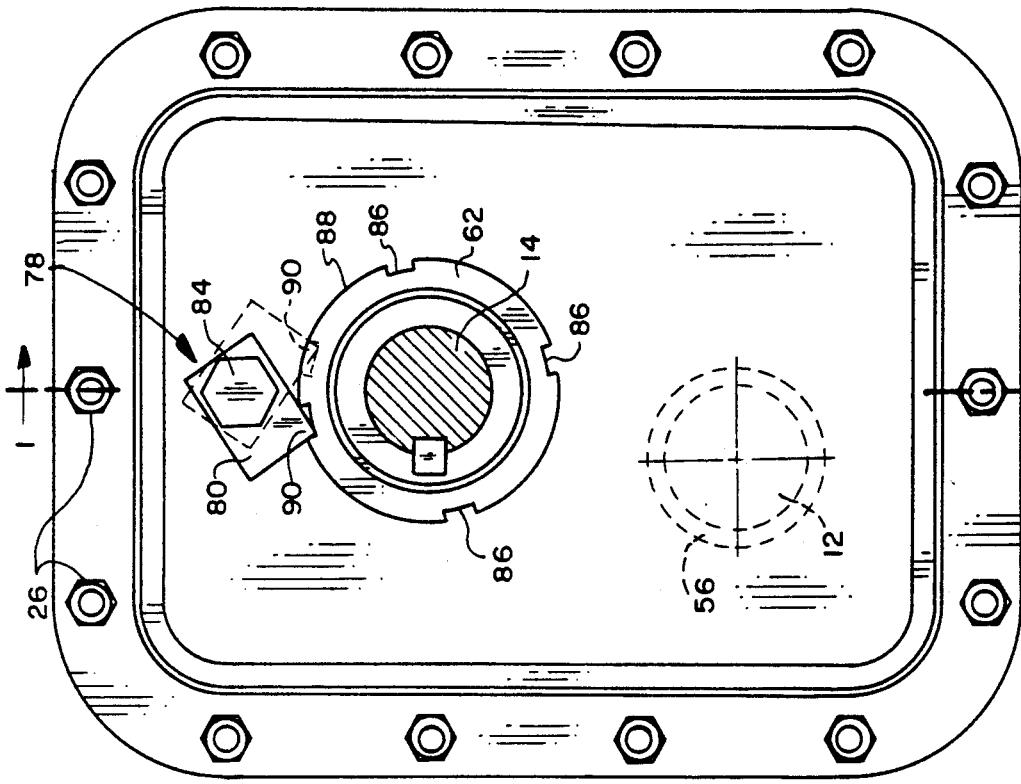
FIG. 2 is a side elevational view of the gear drive shown in FIG. 1, with the prime mover removed.
Figure 1:
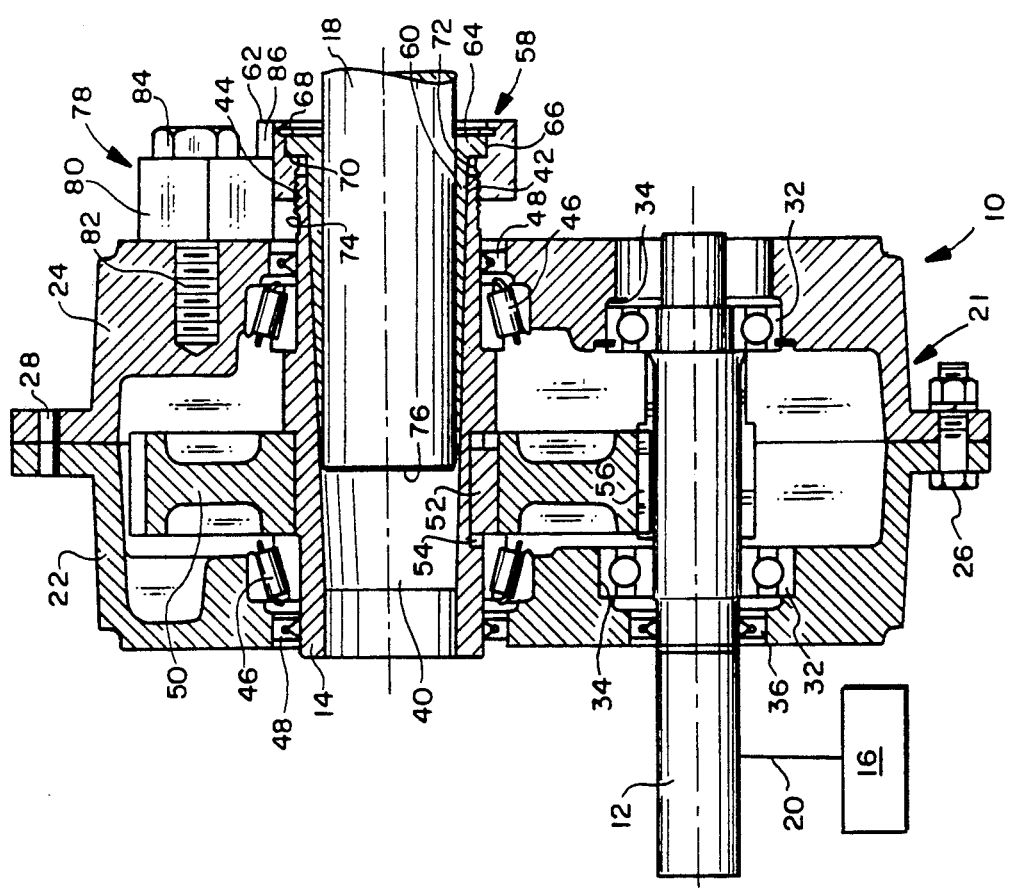
FIG. 1 is a vertical section of a gear drive having a nut locking apparatus according to the invention, and taken generally along line 1—1 of FIG. 2.

Referring to the drawings in greater detail, and first to FIGS. 1-2, a gear drive assembly is generally designated 10 and includes an input shaft 12 coupled with a parallel output shaft 14 for transferring power between a prime mover 16 and an axially extending shaft 18 which is to be driven by the prime mover 16. The prime mover is coupled with input shaft 12 by means of a belt 20, shown schematically in FIG. 1, and may comprise an internal combustion engine, an electric motor, or any known mechanism effective to rotate the input shaft. Driven shaft 18 can be, for example, the operative shaft of accessory equipment such as a conveyor, a pump, or a fan.

Input shaft 12 and output shaft 14 are journaled for rotation within a housing 21 defined by an inner housing half 22 and an outer housing half 24. The inner and outer housing halves are joined by a plurality of bolts 26 spaced peripherally around the housing 21 and inserted through openings 28 formed in a peripheral flange 30 formed on the housing halves 22,24. The input shaft is mounted within the housing 21 by a pair of axially spaced ball or roller bearings 32 which are seated in annular recesses 34 formed in the housing. An oil seal 36 is concentric with the drive pinion and is mounted within a housing bore formed in inner housing half 22.

Output shaft 14 is journaled within housing 21 by a pair of axially spaced bearings 46 and has an axially extending tapered passageway 40 defining a generally circular opening 42 at an end 44 thereof. Annular oil seals 48 flank bearings 46 and are concentric with the output shaft.

A gear 50 is rotatably fixed to output shaft 14 by a key 52 on the gear and a complementary keyway 54 formed in the output shaft. Gear 50 meshes with a pinion 56 mounted on the input shaft, such that rotation of the input shaft and pinion in one direction is effective to impart a counter rotation to output shaft 14. That is, when prime mover 16 is energized to rotate the input shaft and pinion in a clockwise direction, as viewed in FIG. 2, output shaft 14 is rotatably driven in a counterclockwise direction. Conversely, counterclockwise rotation of input shaft 12 effects clockwise rotation of output shaft 14.

As is generally known, the relationship between the outer diameter of pinion 56 and gear 50 establishes a differential relationship between the rotational speed of input shaft 12 and output shaft 14. Because the amount of power transferred between the shafts remains constant, the differential in rotational speed establishes a differential in torque as well. Particularly, because the diameter of gear 50 is much larger than that of pinion 56, the output shaft is rotated at a much slower rate than the rate at which the input shaft is driven by prime mover 16. Accordingly, the amount of torque applied to the input pinion is magnified by the interposed gearing, and the torque available at output shaft 14 is thus much greater than the torque applied to the input shaft.

In order to drivingly connect output shaft 14 with driven shaft 18, a coupling, generally designated 58, is provided and includes a tapered bushing 60 seated in a retaining nut 62. The tapered bushing has an annular outwardly directed flange or head 64 which is received in an annular recess 66 formed in the retaining nut. Bushing 60 is prevented from moving axially relative to the retaining nut by a snap ring 68 which clamps the bushing head against a radially extending shoulder 70 formed on the retaining nut.

Retaining nut 62 has a series of helical threads 72 for engaging complementary helical threads 74 formed on end 44 of output shaft 14, such that relative rotation of the retaining nut and the output shaft 14 causes relative axial movement therebetween and axially moves bushing 60 along driven shaft 18.

Specifically, when helical threads 72 and 74 are configured with conventional right-handed threads, clockwise rotation of retaining nut 62 relative to output shaft 14 (as viewed in FIG. 2) causes the retaining nut and bushing 60 to advance axially toward the output shaft. Conversely, counterclockwise rotation of retaining nut 62 relative to output shaft 14 (as viewed in FIG. 2) causes the retaining nut to move axially away from the output shaft and disengages tapered bushing 60 therefrom.

It is believed that the manner in which driven shaft 18 is engaged with output shaft 14 and, thus, rotated by prime mover 16 can be understood from the above description and may be summarized as follows. Initially, with driven shaft 18 disengaged from the gear drive assembly, retaining nut 62 and tapered bushing 60 are mounted on the driven shaft and are moved axially away from the end 44 of output shaft 14. Driven shaft end 76 then is inserted into tapered passageway 40 in output shaft 14, and coupling 58 then is moved outwardly along the driven shaft until retaining nut 62 engages end 44 of the output shaft. As will be described in further detail below, retaining nut 62 then is rotated in a clockwise direction relative to the output shaft to fully engage the retaining nut with the output shaft and force tapered bushing 60 into a locking interposed relationship with output shaft 14 and driven shaft 18. Opposite torques are continuously applied to retaining nut 62 and output shaft 14 until the retaining nut and tapered bushing 60 have axially advanced a distance sufficient to couple the driven shaft for synchronous rotation with the output shaft.

When it is desired to disengage the driven shaft from the gear drive assembly, such as when tapered bushing 60 must be removed or replaced with a bushing of different size, retaining nut 62 is rotated in a counterclockwise direction as viewed in FIG. 2, and relative to output shaft 14, to disengage the tapered bushing and permit the withdrawal of driven shaft 18 from the tapered passageway 40.

The means for automatically effecting the relative rotation of retaining nut 62 and output shaft 14 now will be described. Particularly, a nut locking apparatus according to the invention is generally designated 78 and includes a latch 80 pivoted to outer housing half 24 by a cap screw 82. The cap screw has a head 84 which movably clamps latch 80 against the gear housing.

As shown in FIG. 2, retaining nut 62 has a number of generally rectangular notches or grooves 86 angularly spaced about the outer periphery thereof, with each groove extending axially along a cylindrical outer side wall 88 of the retaining nut.

As also shown in FIG. 2, latch 80 is rotatable between a pair of nut locking positions in which a generally square corner 90 on the latch engages one of the grooves 86 on retaining nut 62 to prevent rotation of the retaining nut in one direction. That is, with latch 80 positioned as shown in solid lines in FIG. 2, retaining nut 62 is prevented from rotating in a clockwise direction. Similarly, when latch 80 is positioned as shown in broken lines in FIG. 2, with a corner 90 engaging one of the grooves 86, the retaining nut is prevented from rotating in a counterclockwise direction.

As described above, the manner in which driven shaft 18 is drivingly engaged with output shaft 14 requires that tapered bushing 60 be forcefully driven axially into an interposed relation between the driven shaft and the output shaft. Through the operation of helical threads 72 formed on retaining nut 62 and complementary threads 74 formed on end 44 of the output shaft, relative rotation of the retaining nut and output shaft is sufficient to provide an axial thrust force against the bushing. However, high axial force requirements result in corresponding torque requirements which must be applied oppositely to the retaining nut and output shaft. It is in this regard that nut locking apparatus 78 is advantageously utilized.

Particularly, when it is desired to apply an axial force for moving bushing 60 into engagement with gear drive assembly 10 and thereby couple driven shaft 18 with output shaft 14, coupling 58 is mounted on driven shaft 18 as described above, and the retaining nut is loosely threaded onto end 44 of output shaft 14. Latch 80 then is manually rotated into the position shown in phantom in FIG. 2, with corner 90 preventing counterclockwise rotation of the retaining nut.

A torque then is applied to input shaft 12, as by a hand-held wrench, to rotate the drive pinion in a clockwise direction as viewed in FIG. 2. The gear mesh between pinion 56 and gear 50 which is keyed to the output shaft causes counterclockwise rotation of the output shaft in response to clockwise rotation of the drive pinion. Rotation of output shaft 14 urges identical rotation of retaining nut 62. However, because counterclockwise rotation of the retaining nut is prevented by latch 80, the retaining nut and the output shaft are forced to rotate relative to one another and draw bushing 60 between driven shaft 18 and the output shaft automatically in response to manual rotation of input shaft 12.

As mentioned previously, the reduction ratio established by gear 50 and input shaft 12 causes the torque which is applied to the drive pinion to be multiplied. Consequently, the torque which is applied to output shaft 14, and, therefore, the torque which is reacted by latch 80, is much greater than the manual torque applied to the input shaft 12. As a result, operation of nut locking apparatus 78 permits gear drive assembly 10 to be utilized advantageously for providing an axial force sufficient to maintain the driving connection between output shaft 14 and driven shaft 18 automatically in response to manual rotation of input shaft 12.

Alternatively, nut locking apparatus 78 permits gear drive assembly 10 to provide a mechanical advantage sufficient to disengage retaining nut 62 from output shaft 14 when it is desired to remove or replace bushing 60.

To remove retaining nut 62, latch 80 is rotated into the position shown in solid lines in FIG. 2 to prevent clockwise rotation of the retaining nut, and input shaft 12 is rotated in a counterclockwise direction to cause output shaft 14 to rotate in a clockwise direction, as viewed in FIG. 2. When output shaft 14 rotates and retaining nut 62 is held fixed by latch 80, the retaining nut is moved axially away from gear drive assembly 10. Radially extending shoulder 70 engages head 64 and moves bushing 60 out of engagement with the gear drive as the retaining nut is displaced axially along driven shaft 18.

When the gear drive is used as normally contemplated to transmit torque between input shaft 12 and driven shaft 18, latch 80 may be removed entirely or retained in an inoperative position, disengaged from retaining nut 62.

An alternative latch construction is shown in FIG. 3 and comprises an elongated hook 92 having an enlarged end 94 pivoted to housing 21 by a pin 82 in the latch. Hook 92 has a toothed end 96 engageable with an axial notch or groove 86 formed in retaining nut 62. In the position shown in FIG. 3, hook 92 is effective to prevent clockwise rotation of the retaining nut and thereby facilitates removal of the tapered bushing.

As is illustrated in FIG. 3, hook 92 is designed for use in one direction of rotation only and is not pivotable to a position effective to prevent opposite rotation of the retaining nut. If the hook is pivoted substantially 180 degrees, a generally smooth surface 98 formed on the back of the hook engages the outer periphery of retaining nut 62 which is incapable of engaging one of the notches or grooves 86 formed therein. As result, this alternative construction allows the device to function in one direction of rotation only.

This construction is particularly useful where there is a concern about potential damage that may occur in one direction of operation, for example, if excessive force applied in locking the driven shaft to the output shaft might be adequate to crack the tapered bushing. Nevertheless, it should be observed that the hook may be utilized in restraining the nut from rotation in the opposite direction by removing the hook from the pivotal mounting and remounting the hook in a reversed position to latch the nut against rotation in the opposite direction. As in the embodiment previously described, when the gear drive is operated to transmit torque from the input shaft to the driven shaft, the hook 92 may be removed entirely to avoid interference with normal operation of the gear drive.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A shaft mountable gear drive for transferring power between a power source and an accessory shaft to be driven, comprising:
    gear means drivingly interconnected between the power source and the accessory shaft;
    a coupling axially movable along the accessory shaft and interposed between the gear means and the accessory shaft for establishing a driving connection therebetween in response to movement of the gear means;
    retaining means operatively associated with the gear means for moving the coupling into driving engagement with the accessory shaft and the gear means when the gear means are moved relative to the retaining means; and
    locking means for preventing the retaining means from moving when the gear means are moved.

2. The shaft mountable gear drive of claim 1 wherein the gear means comprise a number of intermeshed gears arranged such that torque applied by the gear means to the accessory shaft is greater than the associated drive torque applied by the power source to the gear means.

3. In a shaft mountable gear drive having an input shaft driven by a power source for transferring power to a driven shaft and an associated output shaft drivingly interconnected between the input shaft and the driven shaft, the output shaft having an axially opening end for receiving an end of the driven shaft, with a retaining nut threadedly engaged with the output shaft open end for holding a tapered bushing between the end of the driven shaft and the output shaft to couple the driven shaft and the output shaft for synchronous rotation, a nut locking apparatus comprising:

a plurality of axially extending grooves peripherally spaced about an outer sidewall of the retaining nut; and a latch pivoted to the gear drive and engageable with any one of the grooves for preventing angular displacement of the retaining nut when the output shaft is rotated by the input shaft to axially displace the retaining nut relative to the output shaft.

4. The locking apparatus of claim 3 wherein the latch has a substantially square end portion for engaging a groove in the retaining nut.

5. The locking apparatus of claim 3 wherein the latch has a hooked end portion for engaging a groove in the retaining nut.

6. The locking apparatus of claim 3 wherein the axial grooves in the retaining nut are substantially square grooves.

7. The locking apparatus of claim 3 wherein the latch is rotatable to a position in which the latch engages one of the grooves for preventing angular displacement of the retaining nut in a direction to axially displace the retaining nut in a direction effective to decrease the axial force with which the tapered bushing is held between the driven shaft and the output shaft.

8. The locking apparatus of claim 7 wherein the latch is rotatable to a position in which the latch is engaged with one of the grooves for preventing angular displacement of the retaining nut in a direction to axially displace the retaining nut in a direction effective to increase the axial force with which the tapered bushing is held between the driven shaft and the output shaft.

9. The locking apparatus of claim 3 wherein the latch is adapted to prevent angular displacement of the retaining nut in only a single direction.

10. The locking apparatus of claim 9 wherein the latch is movable to a position for preventing angular displacement of the retaining nut in direction corresponding only to axial movement of the retaining nut along the output shaft in a direction effective to alternatively increase or decrease the force with which the bushing is held between the driven shaft and the output shaft.

11. A shaft mountable gear drive for transferring power between a power source and an accessory shaft to be driven, comprising:

an input shaft adapted to be connected with a power source;

an output shaft having an axial opening for receiving one end of an accessory shaft, said axial opening having an outwardly divergent tapered configuration;

gearing connecting the input shaft and the output shaft;

coupling means engageable with the output shaft and accessory shaft and for establishing driving engagement therebetween in response to axial advancement of the coupling means along the output shaft, said coupling means comprising a tubular bushing interposed between the output shaft and the driven shaft, and said tubular bushing having a tapered end for seating in the tapered axial opening;

a retaining nut rotatably engaged with the output shaft, the retaining nut and the output shaft having complementary helical threads whereby relative angular displacement of the retaining nut and the output shaft causes axial displacement of the retaining nut along the output shaft for moving the tapered bushing relative to the output shaft in response to rotation of the input shaft; and a locking apparatus engageable with the retaining nut to prevent the retaining nut from rotating when the output shaft is rotated.

12. A shaft mountable gear drive for transferring power between a power source and an accessory shaft to be driven, comprising:

an input shaft adapted to be connected with a power source;

an output shaft operatively associated with the input shaft and having an axial opening for receiving one end of an accessory shaft;

coupling means having a portion interposed between the output shaft and the accessory shaft for establishing driving engagement therebetween in response to axial advancement of the coupling means along the accessory shaft;

a retaining nut rotatably engageable with the output shaft and guided for axial movement along the accessory shaft for moving the coupling means relative to the output shaft in response to rotation of the input shaft; and a locking apparatus for preventing the retaining nut from rotating relative to the output shaft, the locking apparatus comprising a pivotal latch and a groove formed in the retaining nut, the latch being pivoted into engagement with the groove to prevent the retaining nut from rotating when the output shaft is rotated by the input shaft.

13. A shaft mountable gear drive for transferring power between a power source and an accessory shaft to be driven, comprising:

an input shaft adapted to be connected with a power source;

an output shaft having an axial opening for receiving one end of an accessory shaft, said axial opening having an outwardly divergent tapered configuration;

gearing connecting the input shaft and the output shaft;

coupling means engageable with the output shaft and accessory shaft and for establishing driving engagement therebetween in response to axial advancement of the coupling means along the output shaft, said coupling means comprising a tubular bushing interposed between the output shaft and the driven shaft, and said tubular bushing having a tapered end for seating in the tapered axial opening;

a retaining nut rotatably engaged with the output shaft, the retaining nut and the output shaft having complementary helical threads whereby relative angular displacement of the retaining nut and the output shaft causes axial displacement of the retaining nut along the output shaft for moving the tapered bushing relative to the output shaft in response to rotation of the input shaft; and a locking apparatus engageable with the retaining nut to prevent the retaining nut from rotating when the output shaft is rotated, the locking apparatus comprising a pivotal latch and a groove formed in the retaining nut, the latch being pivoted into engagement with the groove to prevent the retaining nut from rotating when the output shaft is rotated by the input shaft.

14. The shaft mountable gear drive of claim 13 wherein the latch is movable to a position for preventing movement of the nut in one direction of rotation.

15. The shaft mountable gear drive of claim 13 wherein the latch is movable between two positions respectively for preventing movement of the nut in two directions of rotation.

* * * * *